(12) United States Patent
Jung et al.

(10) Patent No.: US 10,353,178 B2
(45) Date of Patent: Jul. 16, 2019

(54) LENS OPTICAL SYSTEM AND IMAGING DEVICE

(71) Applicant: ACE SOLUTECH CO., LTD., Seongnam-si, Gyeonggi-do (KR)

(72) Inventors: Pil Sun Jung, Gyeonggi-do (KR); Dong Young Kim, Gyeonggi-do (KR); Chi Ho An, Gyeonggi-do (KR)

(73) Assignee: ACE SOLUTECH CO., LTD. (KR)

( * ) Notice: Subject to any disclaimer, the term of this patent is extended or adjusted under 35 U.S.C. 154(b) by 162 days.

(21) Appl. No.: 15/463,495

(22) Filed: Mar. 20, 2017

(65) Prior Publication Data

US 2017/0276909 A1    Sep. 28, 2017

(30) Foreign Application Priority Data

Mar. 22, 2016  (KR) .................... 10-2016-0033986

(51) Int. Cl.
  *G02B 9/00*  (2006.01)
  *G02B 13/00*  (2006.01)
  *G02B 9/62*  (2006.01)

(52) U.S. Cl.
  CPC ........... *G02B 13/0045* (2013.01); *G02B 9/62* (2013.01)

(58) Field of Classification Search
  CPC ...... G02B 13/0045; G02B 9/62; G02B 13/00; G02B 9/60; G02B 13/04; G02B 13/16; G02B 27/646; G02B 1/00; G02B 13/06; G02B 13/009; G02B 13/22; G02B 13/18; G02B 13/02; G02B 15/14; G02B 15/16; G02B 15/177; G02B 15/22; G02B 15/161; G02B 15/163; G02B 9/64; G02B 9/34; G02B 9/12; G02B 9/04; G02B 9/06; G02B 9/08; G02B 3/00; G02B 3/02; G02B 3/04; G02B 3/06; G02B 3/08; G02B 9/00; G02B 9/02; G02B 9/10; G02B 9/14; G02B 9/16; G02B 9/18; G02B 9/20; G02B 9/22; G02B 9/24; G02B 9/26; G02B 9/28; G02B 9/30; G02B 9/32; G02B 9/36; G02B 9/38; G02B 9/40; G02B 9/42; G02B 9/44; G02B 9/46;
  (Continued)

(56) References Cited

U.S. PATENT DOCUMENTS

2015/0116573 A1* 4/2015 Liao .................. G02B 13/0045
                                                   348/340
2015/0177489 A1* 6/2015 Hashimoto ........ G02B 13/0045
                                                   359/713

(Continued)

FOREIGN PATENT DOCUMENTS

KR       20160075015       6/2016

*Primary Examiner* — William R Alexander
*Assistant Examiner* — Henry A Duong
(74) *Attorney, Agent, or Firm* — Perman & Green, LLP

(57) ABSTRACT

Provided are a lens optical system and an imaging device including the lens optical system. The lens optical system includes first to sixth lenses sequentially arranged from an object side toward an image plane side. The first to sixth lenses have negative, positive, positive, negative, positive, and negative refractive powers, respectively. The lens optical system may satisfy 100≤FOV≤160, and DiaL3≤DiaL1≤DiaL6 where FOV refers to the field of view of the lens optical system in degrees (°), and DiaL1, DiaL3, and DiaL6 refer to the effective diameters of the first lens, the third lens, and the sixth lens, respectively.

19 Claims, 7 Drawing Sheets

(58) Field of Classification Search
CPC ... G02B 9/48; G02B 9/50; G02B 9/52; G02B 9/54; G02B 9/56; G02B 9/58; G02B 13/002
USPC ........ 359/713, 680–682, 749–753, 791, 784, 359/780, 779, 772, 771, 769, 768, 767, 359/764, 763, 760, 754, 748, 689, 686, 359/685, 683, 756, 757, 759
See application file for complete search history.

(56) References Cited

U.S. PATENT DOCUMENTS

| | | | |
|---|---|---|---|
| 2015/0268446 A1* | 9/2015 | Chen | G02B 9/62 348/148 |
| 2016/0178871 A1 | 6/2016 | You | |
| 2016/0341933 A1* | 11/2016 | Liu | G02B 13/0045 |
| 2017/0045716 A1* | 2/2017 | Tang | G02B 13/0045 |

* cited by examiner

LENS OPTICAL SYSTEM AND IMAGING DEVICE

CROSS-REFERENCE TO RELATED APPLICATION

This application claims the benefit of Korean Patent Application No. 10-2016-0033986, filed on Mar. 22, 2016, in the Korean Intellectual Property Office, the disclosure of which is incorporated herein in its entirety by reference.

BACKGROUND

1. Field

One or more aspects of the disclosed embodiment relate to a lens optical system and an imaging device.

2. Brief Description of the Related Developments

Recently, the use and application of cameras including solid-state imaging devices such as complementary metal oxide semiconductor (CMOS) image sensors or charge coupled devices (CCDs) have greatly increased.

Also, the degree of pixel integration in solid-state imaging devices has increased to improve the resolution of cameras. Along with this, small and lightweight cameras have been developed by improving the performance of lens optical systems included in the cameras. Recently, imaging devices including solid-state imaging devices have been applied to mobile devices such as smartphones because such imaging devices are suitable for miniaturization. Particularly, automobiles require cameras and optical systems for various purposes such as forward monitoring, backward monitoring, lane recognition, or autonomous driving. In addition, various action cameras such as drones or camcorders for leisure or sports activities have been developed. In addition, lens optical systems and solid-state imaging devices are applied to fingerprint recognition devices. Since fingerprint recognition devices are used in various fields requiring authentication such as entrance control, electronic commerce, financial transaction, personal computer security, or business approval systems, research has been conducted into imaging devices and optical systems for fingerprint recognition devices.

In general, the optical performance of a camera may be guaranteed by using many lenses in the camera. In this case, however, it is difficult to reduce the size, weight, and manufacturing costs of the camera. On the other hand, if the number of lenses included in a camera is decreased, aberrations may not be sufficiently corrected even though it may be effective in terms of product sizes and price competitiveness.

In general, existing lens optical systems used in camera phones have a field of view (FOV) within the range of about 60° to about 65°. Therefore, there is a need for a small, wide-FOV lens optical system having improved properties such as a high aberration correcting ability and a high degree of resolution.

SUMMARY

One or more aspects of the disclosed embodiment include a lens optical system and an imaging device that are compact enough to be included in a small device such as a cellular phone and are capable of wide-angle photographing.

Additional aspects of the disclosed embodiment will be set forth in part in the description which follows and, in part, will be apparent from the description, or may be learned by practice of the presented disclosed embodiment.

According to one or more aspects of the disclosed embodiment, an lens optical system, from an object side toward an image plane side, includes: a first lens having a negative refractive power; a second lens having a positive refractive power; a third lens having a positive refractive power; a fourth lens having a negative refractive power; a fifth lens having a positive refractive power; and a sixth lens having a negative refractive power, wherein the lens optical system satisfies the following conditions:

$$100 \leq FOV \leq 160 \qquad \text{Condition 1:}$$

$$DiaL3 \leq DiaL1 \leq DiaL6 \qquad \text{Condition 2:}$$

where FOV refers to a field of view of the lens optical system in degrees (°), and DiaL1, DiaL3, and DiaL6 refer to effective diameters of the first lens, the third lens, and the sixth lens, respectively.

The lens optical system may satisfy the following condition:

$$0.6 \leq TTL/IH \leq 1.1 \qquad \text{Condition 3:}$$

where TTL refers to a distance in millimeters (mm) from a center of an entrance surface of the first lens to an image plane, and IH refers to an image height in millimeters (mm) by an effective diameter of the lens optical system.

The lens optical system may satisfy the following condition:

$$0.8 \leq Ind3/Ind4 \leq 1.1 \qquad \text{Condition 4:}$$

where Ind3 and Ind4 refer to refractive indexes of the third and fourth lenses, respectively.

The lens optical system may satisfy the following condition:

$$1.5 \leq Abv3/Abv6 \leq 3.0 \qquad \text{Condition 5:}$$

where Abv3 and Abv6 refer to Abbe numbers of the third and sixth lenses, respectively.

The lens optical system may further include an aperture stop between the second lens and the third lens.

The lens optical system may satisfy the following conditions:

$$0.2 \leq (L1toL2)/OAL \leq 0.45 \qquad \text{Condition 6:}$$

$$1.5 \leq Abv3/Abv4 \leq 3.0 \qquad \text{Condition 7:}$$

$$0.8 \leq Ind3/Ind6 \leq 1.1 \qquad \text{Condition 8:}$$

where L1toL2 refers to a distance in millimeters (mm) between a center of an entrance surface of the first lens and a center of an exit surface of the second lens, OAL refers to a distance in millimeters (mm) between the center of the entrance surface of the first lens and a center of an exit surface of the sixth lens, Abv3 and Abv4 respectively refer to Abbe numbers of the third and fourth lenses, and Ind3 and Ind6 respectively refer to refractive indexes of the third and sixth lenses.

An exit surface of the first lens may be concave toward the image plane side.

An exit surface of the fifth lens may be convex toward the image plane side.

At least one of the first to sixth lenses may be an aspherical lens.

At least one of the first to sixth lenses may be a plastic lens.

At least one of an entrance surface and an exit surface of the sixth lens may be concave toward the image plane side in a center region thereof and may be convex toward the image plane side in a peripheral region thereof.

An entrance surface of the first lens may have a meniscus shape convex toward the object side.

According to one or more aspects of the disclosed embodiment, a lens optical system includes a front lens group, an aperture stop, and a rear lens group that are sequentially arranged from an object side toward an image plane side, wherein: the front lens group includes a first lens having an exit surface concave toward the image plane side, and a first lens having a positive refractive power; and the rear lens group includes a third lens closest to the object side and having a positive refractive power, and an image plane lens closest to the image plane side and having a negative refractive power, wherein the lens optical system satisfies the following conditions:

$100 \leq FOV \leq 160$    Condition 1':

$0.6 \leq TTL/IH \leq 1.1$    Condition 2':

wherein FOV refers to a field of view of the lens optical system in degrees (°), TTL refers to a distance in millimeters (mm) from a center of an entrance surface of the first lens to an image plane, and IH refers to an image height in millimeters (mm) by an effective diameter of the lens optical system.

The lens optical system may further include a fourth lens having a negative refractive power and a fifth lens having a positive refractive power, the fourth and fifth lenses being sequentially arranged between the third lens and the image plane lens in a direction from the object side toward the image plane side.

The lens optical system may satisfy all of the following conditions:

$DiaL3 \leq DiaL1 \leq DiaL6$    Condition 3':

$0.8 \leq Ind3/Ind4 \leq 1.1$    Condition 4':

wherein DiaL1, DiaL3, and DiaL6 respectively refer to effective diameters of the first lens, the third lens, and the image plane lens, and Ind3 and Ind4 respectively refer to refractive indexes of the third and fourth lenses.

The lens optical system may satisfy the following condition:

$1.5 \leq Abv3/Abv6 \leq 3.0$    Condition 5':

where Abv3 and Abv6 refer to Abbe numbers of the third lens and the image plane lens, respectively.

The first lens may have a negative refractive power.

At least one of an entrance surface and an exit surface of the image plane lens may have at least one inflection point in a direction from a center region to an edge thereof.

At least one of the lenses of the front lens group and the rear lens group may be an aspherical lens.

According to one or more aspects of the disclosed embodiment, an imaging device includes: any one of the lens optical systems; and a solid-state imaging device configured to pick up an image formed by the lens optical system.

As described above, according to the one or more of the above aspects of the disclosed embodiment, the lens optical system and the lens optical system have a wide or ultra-wide field of view (FOV) and are compact enough to be included in a small device such as a cellular phone.

BRIEF DESCRIPTION OF THE DRAWINGS

These and/or other aspects of the disclosed embodiment will become apparent and more readily appreciated from the following description of the aspects of the disclosed embodiment, taken in conjunction with the accompanying drawings in which.

DETAILED DESCRIPTION

Figure 1:
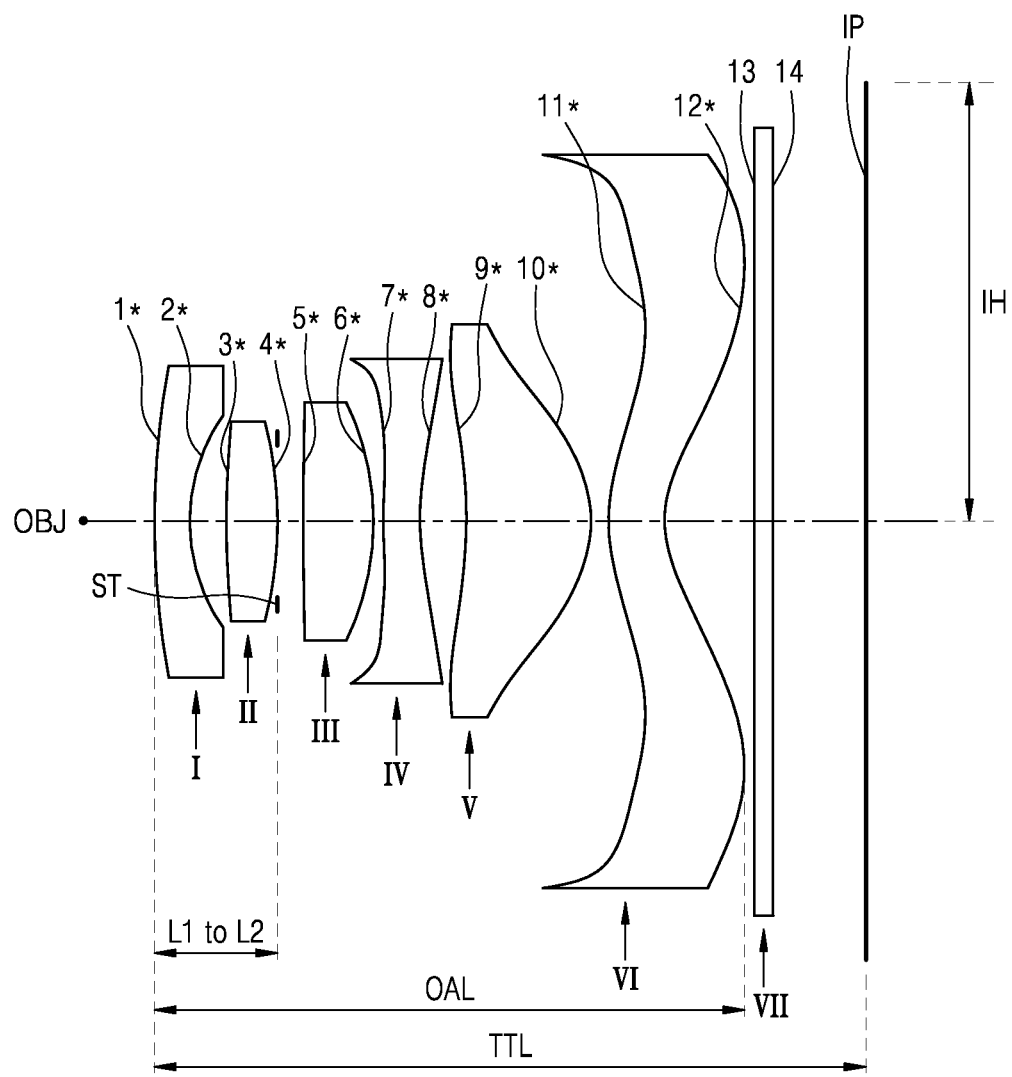
FIG. 1 is a cross-sectional view illustrating an arrangement of elements of a lens optical system according to a first aspect of the disclosed embodiment.

Reference will now be made in detail to the aspects of the disclosed embodiment, examples of which are illustrated in the accompanying drawings. In this regard, the presently disclosed embodiment may have different forms and should not be construed as being limited to the descriptions set forth herein. Accordingly, the aspects of the disclosed embodiment are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, lens optical systems and imaging devices will be described according to aspects of the disclosed embodiment with reference to the accompanying drawings. In the drawings, like reference numerals refer to like (or similar) elements.

In the following description, the term "image plane" refers to a plane on which images are formed by light passing through a lens optical system, and the term "image plane side" may refer to a side at which an imaging device such as an image sensor is located or a direction toward the side. The term "object side" may refer to a side opposite an image plane side based on a lens optical system. In addition, a surface of a lens facing an object side may be referred to as an entrance surface, and the other surface of the lens facing an image plane side may be referred to as an exit surface.

FIG. 1 is a schematic cross-sectional view illustrating an arrangement of elements of a lens optical system according to a first aspect of the disclosed embodiment.

The lens optical system includes a front lens group, an aperture stop ST, and a rear lens group that are sequentially arranged in a direction from an object (OBJ) side toward an image plane (IP) side. The front lens group and the rear lens group may be separated by the aperture stop ST. If the aperture stop ST is not used, the front lens group and the rear lens group may be distinguished based on a fixed aperture stop surface.

For example, the front lens group may include a first lens I having a negative (−) refractive power and a second lens II having a positive (+) refractive power.

For example, the first lens I may have an exit surface 2* concave toward the IP side. For example, the first lens I may have an entrance surface 1* convex toward the OBJ side. In other words, the first lens I may have a meniscus shape convex toward the OBJ side.

For example, the second lens II may have an exit surface 4* convex toward the IP side. For example, the second lens II may have an entrance surface 3* convex toward the OBJ side. In other words, the second lens II may have a biconvex shape.

For example, the rear lens group may include a third lens III having a positive (+) refractive power, a fourth lens IV having a negative (−) refractive power, a fifth lens V having a positive (+) refractive power, and a sixth lens VI having a negative (−) refractive power.

For example, the third lens III may have an exit surface 6* convex toward the IP side. For example, the third lens III may have an entrance surface 5* convex toward the OBJ side. In other words, the third lens III may have a biconvex shape.

For example, the fourth lens IV may have an exit surface 8* concave toward the IP side. For example, the fourth lens IV may have an entrance surface 7* concave toward the OBJ side. In other words, the fourth lens IV may have a biconcave shape.

For example, the fifth lens V may have an exit surface 10* convex toward the IP side. For example, the fifth lens V may have an entrance surface 9* concave toward the OBJ side. In other words, the fifth lens V may have a meniscus shape convex toward the IP side.

For example, at least one of an entrance surface 11* and an exit surface 12* of the sixth lens VI may have at least one inflection point. Herein, the term "inflection point" may refer to a point at which the sign of the radius of curvature of a lens surface changes from positive (+) to negative (−), or from negative (−) to positive (+). In addition, the term "reflection point" may refer to a point at which the shape of a lens surface changes from convex to concave, or from concave to convex. For example, the sixth lens VI may have a meniscus shape convex toward the OBJ side in a center region (in a region within a certain radius from an optical axis). For example, the exit surface 12* of the sixth lens VI may be concave toward the IP side in a region adjacent to the optical axis and may then be convex toward the IP side in a peripheral region away from the optical axis. For example, the entrance surface 11* of the sixth lens VI may be convex toward the OBJ side in a region adjacent to the optical axis and may then be concave toward the OBJ in a peripheral region away from the optical axis.

The above-described refractive power distribution of the front lens group and the rear lens group may make it easy to control chromatic aberration. In addition, according to the disclosed embodiment, since the aperture stop ST is placed between the front lens group and the rear lens group, the optical power of the lens optical system may be distributed in such a manner that the lens optical system may have a sufficient degree of performance when capturing images with an ultra-wide field of view.

At least one optical filter VII may be provided between the sixth lens VI and an IP. For example, the optical filter VII may include at least one of low-pass filters, infrared (IR)-cut filters, and cover glass. For example, if the optical filter VII includes an IR filter, visible rays may pass through the optical filter VII but infrared rays may not pass through the optical filter VII. Thus, infrared rays may not reach the IP. However, the lens optical system may not include the optical filter VII.

For example, the front lens group and the rear lens group may include at least one aspherical lens. For example, at least one of the first to sixth lenses I to VI may be an aspherical lens. For example, all of the first to sixth lenses I to VI may be aspherical lenses.

In the lens optical system of the disclosed embodiment having the above-described configuration, at least one of the first to sixth lenses I to VI may include a plastic material. For example, each of the first to sixth lenses I to VI may include a plastic material. Plastic lenses may be lighter and easier to mass-produce than glass lenses. However, materials of the first to sixth lenses I to VI are not limited to plastics. If necessary, at least one of the first to sixth lenses I to VI may include glass. Glass lenses may be more reliable than plastic lenses. For example, if an aspherical surface is applied to a glass lens, various effects such as length reduction, compact shape, aberration correction, or high performance may be obtained. For example, some of the first to sixth lenses I to VI may be plastic lenses, and the others of the first to sixth lenses I to VI may be glass lenses.

The lens optical system of the disclosed embodiment may have a wide field of view, for example, within the range of about 100° or greater, and may have a high degree of performance. The lens optical system of the disclosed embodiment may have wide-angle performance and a short total length as well so as to be accommodated in a cellular phone.

The lens optical system of the disclosed embodiment may satisfy the following condition.

$$100 \leq FOV \leq 160 \qquad \text{Condition 1:}$$

where FOV refers to the field of view of the lens optical system in degrees (°).

The lens optical system of the disclosed embodiment may satisfy the following condition.

$$DiaL3 \leq DiaL1 \leq DiaL6 \qquad \text{Condition 2:}$$

where DiaL1, DiaL3, and DiaL6 refer to the effective diameters of the first lens I, the third lens III, and the sixth lens VI, respectively.

Condition 2 is for imparting high performance to the lens optical system while maintaining wide-angle performance of the lens optical system. According to Condition 2, the effective diameter of the first lens I may be greater than the effective diameter of the third lens III but less than the effective diameter of the sixth lens VI.

The lens optical system of the disclosed embodiment may satisfy the following condition.

$$0.6 \leq TTL/IH \leq 1.1 \qquad \text{Condition 3:}$$

where TTL refers to the distance in millimeters (mm) from the center of the entrance surface 1* of the first lens I to the IP, and IH refers to an image height in millimeters (mm) by the effective diameter of the lens optical system.

The lens optical system satisfying Condition 3 has a relatively short total length compared to the size of the IP such that the lens optical system may be sufficiently short to be included in a cellular phone while having ultra-wide angle lens characteristics.

The lens optical system of the disclosed embodiment may satisfy the following condition.

$$0.8 \leq Ind3/Ind4 \leq 1.1 \qquad \text{Condition 4:}$$

where Ind3 and Ind4 refer to the refractive indexes of the third lens III and the fourth lens IV, respectively.

The lens optical system satisfying Condition 4 may have low chromatic aberration by adjusting the refractive index of the third lens III to be relatively low and the refractive index of the fourth lens IV to be relatively high.

The lens optical system of the disclosed embodiment may satisfy the following condition.

$$1.5 \leq Abv3/Abv6 \leq 3.0 \quad \text{Condition 5:}$$

where Abv3 and Abv6 refer to the Abbe numbers of the third lens III and the sixth lens VI, respectively.

The lens optical system satisfying Condition 5 may have low chromatic aberration because the Abbe number of the third lens III is relatively large and the Abbe number of the sixth lens VI is relatively small.

The lens optical system of the disclosed embodiment may satisfy at least one of the following conditions.

$$0.2 \leq (L1toL2)/OAL \leq 0.45 \quad \text{Condition 6:}$$

$$1.5 \leq Abv3/Abv4 \leq 3.0 \quad \text{Condition 7:}$$

$$0.8 \leq Ind3/Ind6 \leq 1.1 \quad \text{Condition 8:}$$

where L1toL2 refers to the distance in millimeters (mm) between the center of the entrance surface 1* of the first lens I and the center of the exit surface 4* of the second lens II, OAL refers to the distance in millimeters (mm) between the center of the entrance surface 1* of the first lens I and the center of the exit surface 12* of the sixth lens VI, Abv3 and Abv4 respectively refer to the Abbe numbers of the third lens III and the fourth lens IV, and Ind3 and Ind6 respectively refer to the refractive indexes of the third lens III and the sixth lens VI.

Condition 6 is for imparting high performance to the lens optical system while maintaining wide-angle performance of the lens optical system. According to Condition 6, the total thickness of the first and second lenses I and II may be limited relative to the total thickness of the lenses of the lens optical system.

The lens optical system satisfying Condition 7 may have low chromatic aberration because the Abbe number of the third lens III is relatively large and the Abbe number of the fourth lens IV is relatively small.

The lens optical system satisfying Condition 8 may have low chromatic aberration by adjusting the refractive index of the third lens III to be relatively low and the refractive index of the sixth lens VI to be relatively high.

In the description of the photographing lens of the disclosed embodiment, the term "aspherical" or "aspherical surface" has the following definition.

When an optical axis is set as an x-axis, a direction perpendicular to the optical axis is set as a y-axis, and the propagation direction of rays is denoted as a positive direction, an aspherical surface of a lens may be defined by the following equation. In the equation, x denotes a distance measured from the vertex of a lens in the direction of the optical axis of the lens, y denotes a distance measured from the optical axis in a direction perpendicular to the optical axis, K denotes a conic constant, A, B, C, D, E, and F denote aspherical coefficients, and c' denotes the reciprocal (1/R) of the radius of curvature at the vertex of the lens.

⟨Aspherical surface equation⟩

$$x = \frac{c'y^2}{1+\sqrt{1-(K+1)c'^2 y^2}} + Ay^4 + B6 + Cy^8 + Dy^{10} + Ey^{12} + Fy^{14}$$

Variously designed lens optical systems may be provided according to numerical aspects of the disclosed embodiment as described below.

In each numerical aspect of the disclosed embodiment, lens surfaces are sequentially numbered in a direction from an OBJ side to an IP side (1, 2, 3, . . . , n where n is an natural number), and these lens surface numbers are illustrated in the accompanying drawings. In addition, OBJ refers to an object, F-no refers to an F-number, FOV refers to a field of view, R refers to a radius of curvature, Dn refers to a lens thickness or an air gap between lenses, Nd refers to a refractive index, and Vd refers to an Abbe number. In addition, ST refers to an aperture stop, and refers to an aspherical surface.

First Numerical Aspect of the Disclosed Embodiment

FIG. 1 illustrates the lens optical system according to a first numerical aspect of the disclosed embodiment, and design data for the lens optical system of the first numerical aspect of the disclosed embodiment are shown in Table 1 below.

TABLE 1

| Surfaces | | R | Dn | Nd | Vd |
|---|---|---|---|---|---|
| I | 1* | 5.38858 | 0.20000 | 1.53175 | 55.85588 |
|   | 2* | 1.35189 | 0.19965 | | |
| II | 3* | 3.12997 | 0.28870 | 1.54410 | 56.09278 |
|   | 4* | −6.21263 | 0.00000 | | |
|   | ST | Infinity | 0.14018 | | |
| III | 5* | 4.60197 | 0.40000 | 1.54410 | 56.09278 |
|   | 6* | −1.70570 | 0.05119 | | |
| IV | 7* | 4.42167 | 0.20425 | 1.65041 | 21.47439 |
|   | 8* | 1.58014 | 0.25963 | | |
| V | 9* | −2.26505 | 0.69466 | 1.54410 | 56.09278 |
|   | 10* | −0.65152 | 0.10000 | | |
| VI | 11* | 0.96313 | 0.30677 | 1.63916 | 23.51650 |
|   | 12* | 0.49480 | 0.50000 | | |
| VII | 13 | Infinity | 0.11000 | 1.51680 | 64.19733 |
|   | 14 | Infinity | 0.51659 | | |
|   | IP | Infinity | −0.00162 | | |

Table 2 below shows aspherical coefficients in the first numerical aspect of the disclosed embodiment.

TABLE 2

| Surfaces | K | A | B | C | D | E | F |
|---|---|---|---|---|---|---|---|
| 1* | 0.00000 | 0.23663 | −0.47411 | 0.41424 | −0.26264 | 0.06926 | 0.00000 |
| 2* | 0.49242 | 0.44831 | 0.30393 | −5.20069 | 24.48526 | −56.51473 | 57.85727 |
| 3* | −9.53849 | −0.03549 | −0.02961 | −3.38233 | 13.44525 | −28.45593 | 17.00391 |
| 4* | 0.00000 | −0.36946 | 0.07024 | −8.98445 | 77.70318 | −301.67514 | 434.10949 |

TABLE 2-continued

| Surfaces | K | A | B | C | D | E | F |
|---|---|---|---|---|---|---|---|
| 5* | 33.57819 | −0.17827 | −0.42554 | −0.17918 | 1.46650 | 3.79797 | −7.90195 |
| 6* | 1.52801 | −0.26747 | 1.96969 | −8.29799 | 16.94214 | −16.55468 | 6.25737 |
| 7* | 0.00000 | −0.75301 | 1.68773 | −3.47642 | 5.15225 | −3.94199 | 0.60685 |
| 8* | 1.29319 | −0.56758 | 0.70244 | −0.78779 | 0.54562 | −0.26362 | 0.02586 |
| 9* | 3.38076 | 0.27235 | −0.08416 | −0.35635 | 0.96348 | −0.88125 | 0.32409 |
| 10* | −0.89629 | 0.54443 | −0.72668 | 0.87632 | −0.84386 | 0.58734 | −0.16122 |
| 11* | −10.25915 | 0.08289 | −0.23063 | 0.15164 | −0.05090 | 0.00939 | −0.00076 |
| 12* | −4.07853 | −0.02992 | −0.05333 | 0.04139 | −0.01489 | 0.00269 | −0.00020 |

Figure 4:
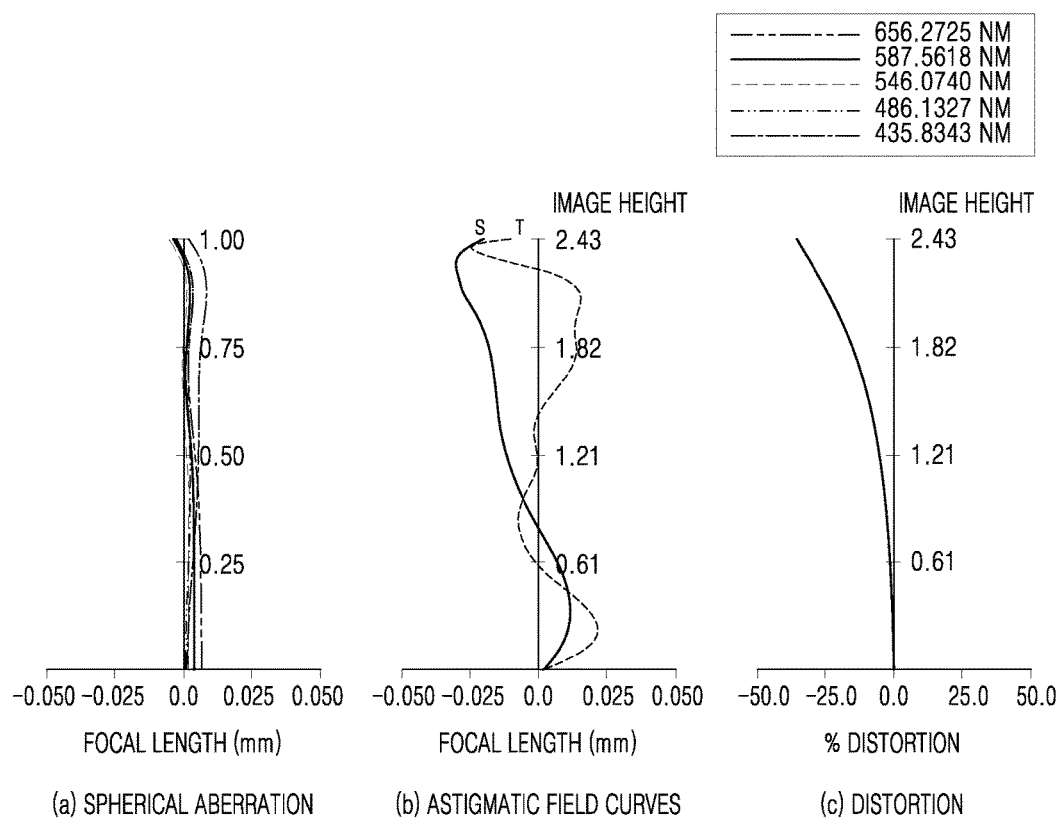
FIG. 4 illustrates spherical aberration, astigmatic field curves, and distortion of the lens optical system of the first aspect of the disclosed embodiment.

FIG. 4 illustrates longitudinal spherical aberration, astigmatic field curves, and distortion of the lens optical system of the first numerical aspect of the disclosed embodiment. The astigmatic field curves include a tangential field curvature T and a sagittal field curvature S.

Second Numerical Aspect of the Disclosed Embodiment

Figure 2:
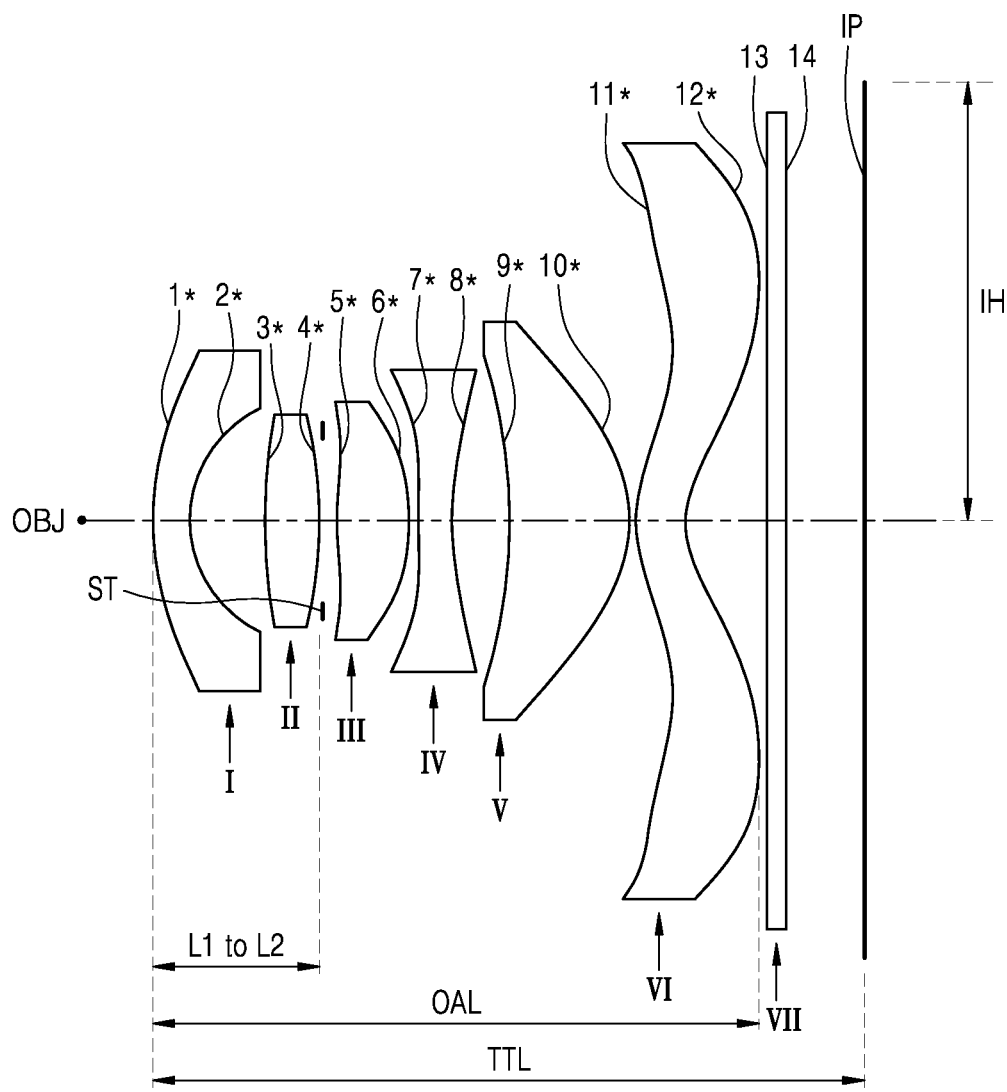
FIG. 2 is a cross-sectional view illustrating an arrangement of elements of a lens optical system according to a second aspect of the disclosed embodiment.

FIG. 2 illustrates a lens optical system according to a second numerical embodiment, and design data for the lens optical system of the second numerical aspect of the disclosed embodiment are shown in Table 3 below.

TABLE 3

|  | Surfaces | R | Dn | Nd | Vd |
|---|---|---|---|---|---|
| I | 1* | 1.54302 | 0.20000 | 1.54410 | 56.09278 |
|  | 2* | 0.59356 | 0.66010 |  |  |
| II | 3* | 1.38790 | 0.40001 | 1.54410 | 56.09278 |
|  | 4* | −126.87409 | 0.06516 |  |  |
|  | ST | Infinity | 0.07981 |  |  |
| III | 5* | 8.74369 | 0.47406 | 1.54410 | 56.09278 |
|  | 6* | −1.23214 | 0.03000 |  |  |
| IV | 7* | 24.29459 | 0.20000 | 1.65041 | 21.47439 |
|  | 8* | 1.82952 | 0.24540 |  |  |
| V | 9* | −7.42444 | 0.63984 | 1.54410 | 56.09278 |
|  | 10* | −0.77156 | 0.03000 |  |  |
| VI | 11* | 1.07683 | 0.24000 | 1.63916 | 23.51650 |
|  | 12* | 0.61217 | 0.50000 |  |  |
| VII | 13 | Infinity | 0.11000 | 1.51680 | 64.19733 |
|  | 14 | Infinity | 0.59562 |  |  |
|  | IP | Infinity | 0.00030 |  |  |

Table 4 below shows aspherical coefficients in the second numerical aspect of the disclosed embodiment.

TABLE 4

| Surfaces | K | A | B | C | D | E | F |
|---|---|---|---|---|---|---|---|
| 1* | 0.00000 | 0.38218 | −0.60906 | 0.58725 | −0.52200 | 0.18356 | 0.00000 |
| 2* | 0.33411 | 0.51474 | 1.36310 | −11.55004 | 45.26891 | −85.69890 | 75.00534 |
| 3* | 7.36071 | −0.10686 | −0.03099 | −1.52645 | 7.38574 | −16.39375 | 8.41709 |
| 4* | 0.00000 | −0.44495 | 1.30272 | −11.74656 | 57.51025 | −146.92411 | 146.14872 |
| 5* | −7.42098 | −0.17811 | −0.89130 | 5.95759 | −22.38510 | 33.59487 | −14.96676 |
| 6* | 1.71291 | −0.31862 | 1.59165 | −3.25351 | 2.07822 | 0.00000 | 0.00000 |
| 7* | 0.00000 | −1.04065 | 2.70886 | −4.32460 | 2.47091 | 0.51859 | −0.62454 |
| 8* | 1.23672 | −0.70917 | 1.34792 | −1.76285 | 0.99148 | 0.06520 | −0.25632 |
| 9* | 4.88907 | 0.29974 | −0.75039 | 1.34658 | −1.43640 | 0.90424 | −0.26059 |
| 10* | −0.81507 | 0.27782 | 0.09223 | −0.80957 | 1.20530 | −0.70082 | 0.14521 |
| 11* | −5.11723 | −0.10491 | −0.12561 | 0.13522 | −0.05095 | 0.00882 | −0.00059 |
| 12* | −3.04170 | −0.20079 | 0.10928 | −0.04800 | 0.01369 | −0.00210 | 0.00012 |

Figure 5:
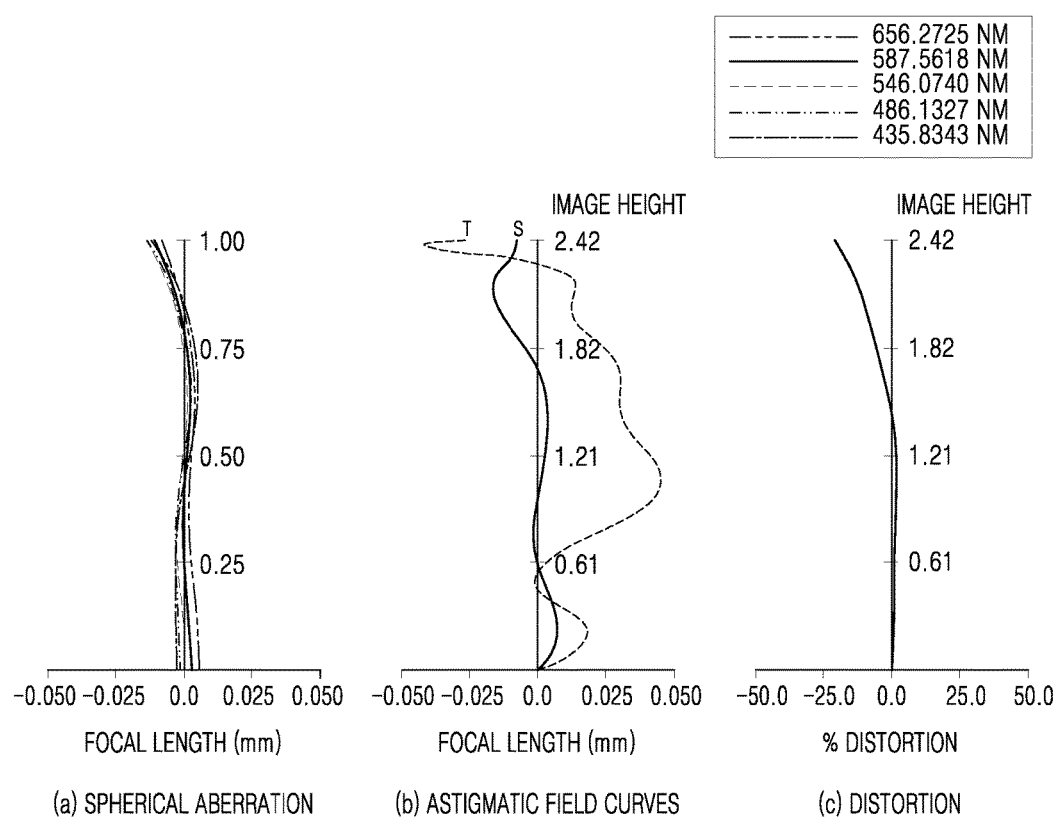
FIG. 5 illustrates spherical aberration, astigmatic field curves, and distortion of the lens optical system of the second aspect of the disclosed embodiment.

FIG. 5 illustrates longitudinal spherical aberration, astigmatic field curves, and distortion of the lens optical system of the second numerical aspect of the disclosed embodiment.

Third Numerical Aspect of the Disclosed Embodiment

Figure 3:
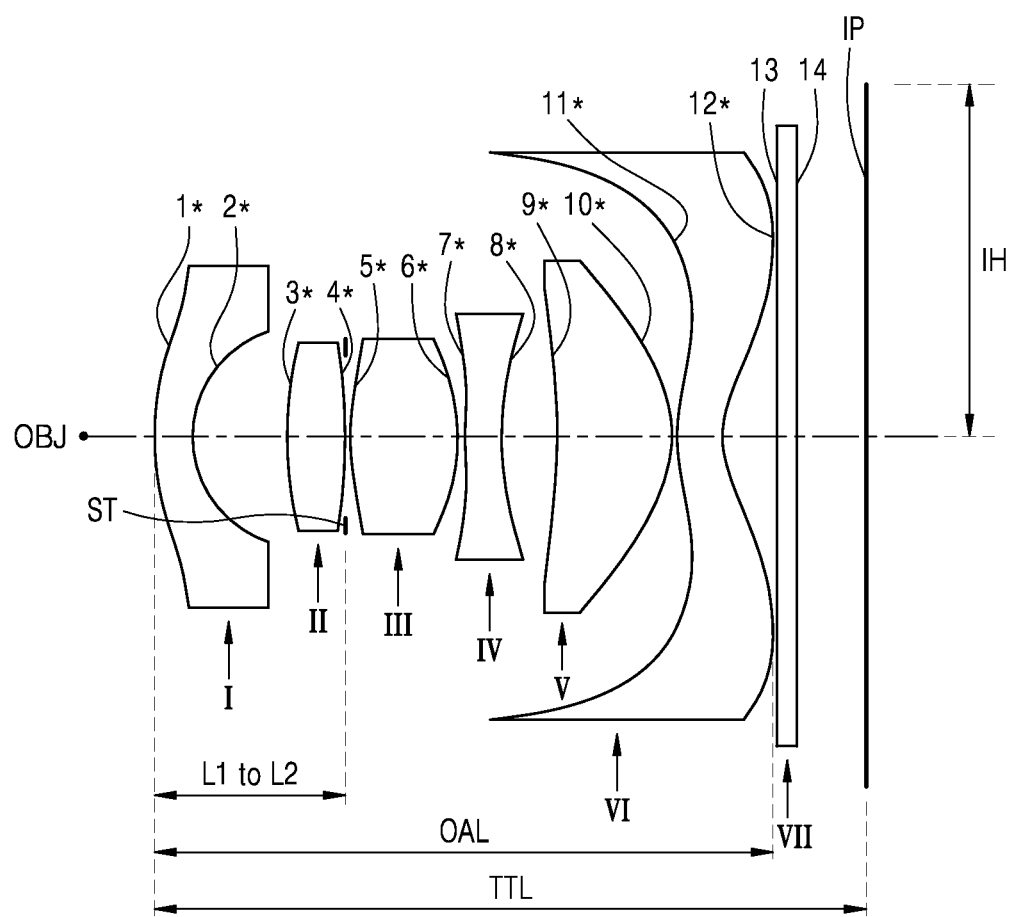
FIG. 3 is a cross-sectional view illustrating an arrangement of elements of a lens optical system according to a third aspect of the disclosed embodiment.

FIG. 3 illustrates a lens optical system according to a third numerical embodiment, and design data for the lens optical system of the third numerical aspect of the disclosed embodiment are shown in Table 5 below.

TABLE 5

|  | Surfaces | R | Dn | Nd | Vd |
|---|---|---|---|---|---|
| I | 1* | 1.81908 | 0.21030 | 1.53175 | 55.85588 |
|  | 2* | 0.62659 | 0.52700 |  |  |
| II | 3* | 3.47081 | 0.32464 | 1.53175 | 55.85588 |
|  | 4* | −5.38591 | −0.00360 |  |  |
|  | ST | Infinity | 0.03360 |  |  |
| III | 5* | 1.42413 | 0.59365 | 1.53175 | 55.85588 |
|  | 6* | −1.45978 | 0.04633 |  |  |
| IV | 7* | 3.76032 | 0.20000 | 1.65041 | 21.47439 |
|  | 8* | 1.36628 | 0.31074 |  |  |
| V | 9* | −3.56044 | 0.64241 | 1.54410 | 56.09278 |
|  | 10* | −0.68311 | 0.03000 |  |  |
| VI | 11* | 0.95559 | 0.25000 | 1.63916 | 23.51650 |
|  | 12* | 0.49798 | 0.30674 |  |  |
| VII | 13 | Infinity | 0.11000 | 1.51680 | 64.19733 |
|  | 14 | Infinity | 0.38559 |  |  |
|  | IP | Infinity | 0.00259 |  |  |

Table 6 below shows aspherical coefficients in the third numerical aspect of the disclosed embodiment.

TABLE 6

| Surfaces | K | A | B | C | D | E | F |
|---|---|---|---|---|---|---|---|
| 1* | 0.00000 | 0.27072 | −0.83559 | 0.67204 | −0.25118 | 0.03671 | 0.00000 |
| 2* | −0.06350 | 0.52375 | 1.09758 | −17.37339 | 78.50664 | ######## | 147.06732 |
| 3* | 32.11121 | 0.15249 | 0.12139 | −1.03949 | 5.08573 | −12.39451 | 12.52694 |
| 4* | 0.00000 | −0.61830 | 3.58402 | −19.02035 | 61.34394 | −99.53811 | 62.71534 |
| 5* | −3.81969 | −0.49031 | 3.17771 | −16.67401 | 39.10203 | −26.42633 | −43.08533 |
| 6* | 1.64230 | −1.01826 | 7.08305 | −33.17504 | 103.84715 | ######## | 155.42776 |
| 7* | 0.00000 | −1.62487 | 6.05172 | −21.55611 | 60.24773 | ######## | 75.69425 |
| 8* | 1.56634 | −0.72658 | 1.08301 | −0.62032 | −1.31839 | 2.64782 | −2.06109 |
| 9* | 9.65706 | 0.24248 | −0.69327 | 1.68163 | −2.61807 | 2.23123 | −0.67949 |
| 10* | −0.78666 | 0.65051 | −0.87678 | 0.55875 | 0.72698 | −1.33573 | 0.58773 |
| 11* | −10.20070 | −0.20294 | −0.39705 | 0.76161 | −0.55039 | 0.18636 | −0.02552 |
| 12* | −3.72868 | −0.30242 | 0.21355 | −0.10658 | 0.03479 | −0.00713 | 0.00063 |

Figure 6:
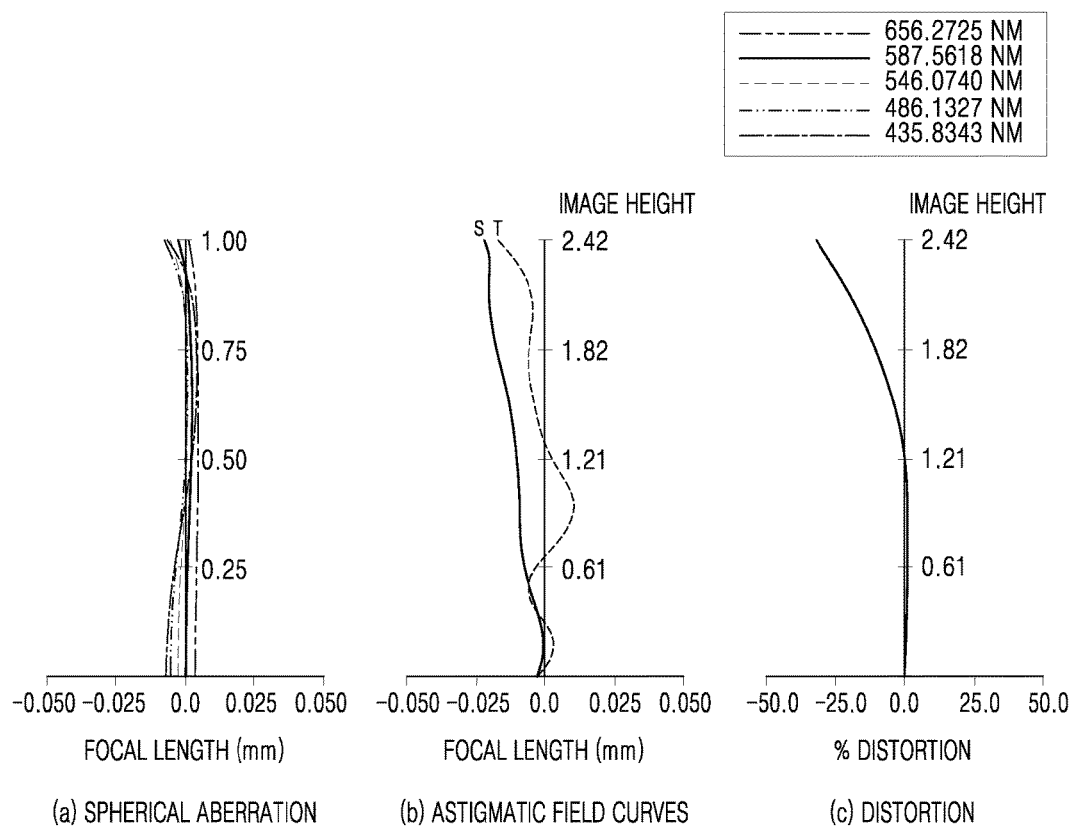
FIG. 6 illustrates spherical aberration, astigmatic field curves, and distortion of the lens optical system of the third aspect of the disclosed embodiment.

FIG. 6 illustrates longitudinal spherical aberration, astigmatic field curves, and distortion of the lens optical system of the third numerical aspect of the disclosed embodiment.

In addition, the F-number (F-no), focal length (f), and field of view (FOV) of each of the lens optical systems of the first to third numerical aspects of the disclosed embodiment are shown in Table 7 below.

TABLE 7

| Embodiments | F-no | f [mm] | FOV [°] |
|---|---|---|---|
| First | 2.44 | 1.88 | 127.01 |
| Second | 2.05 | 1.57 | 125.70 |
| Third | 2.08 | 1.37 | 128.85 |

Table 8 below shows that the lens optical systems of the first to third numerical aspects of the disclosed embodiment satisfy Conditions 1 to 8. In Table 8, FOV denotes a field of view in degrees (°).

TABLE 8

| Conditions | Expression | First Numerical Embodiment | Second Numerical Embodiment | Third Numerical Embodiment |
|---|---|---|---|---|
| 1 | 100 ≤ Fov ≤ 160 | 127.01 | 125.70 | 128.85 |
| 2 | DiaL3 ≤ DiaL1 ≤ DiaL6 | — | — | — |
| 3 | 0.6 ≤ TTL/IH ≤ 1.1 | 0.82 | 0.82 | 1.02 |
| 4 | 0.8 ≤ Ind3/Ind4 ≤ 1.1 | 0.94 | 0.94 | 0.93 |
| 5 | 1.5 ≤ Abv3/Abv6 ≤ 3.0 | 2.39 | 2.39 | 2.38 |
| 6 | 0.2 ≤ (L1toL2)/OAL ≤ 0.45 | 0.24 | 0.31 | 0.34 |
| 7 | 1.5 ≤ Abv3/Abv4 ≤ 3.0 | 2.61 | 2.61 | 2.60 |
| 8 | 0.7 ≤ Ind3/Ind6 ≤ 1.5 | 0.94 | 0.94 | 0.93 |

Table 9 shows values of variables used to obtain data shown in Table 8. In Table 9, TTL, IH, DiaL1, DiaL2, DiaL3, L1toL2, and OAL are in millimeters (mm).

TABLE 9

| Varibles | First Numerical Embodiment | Second Numerical Embodiment | Third Numerical Embodiment |
|---|---|---|---|
| TTL | 3.97 | 3.97 | 3.97 |
| IH | 4.85 | 4.85 | 3.90 |
| DiaL3 | 1.720 | 1.885 | 1.893 |
| DiaL1 | 1.322 | 1.320 | 1.080 |
| DiaL6 | 4.064 | 4.180 | 3.143 |
| L1toL2 | 0.688 | 0.934 | 1.062 |
| OAL | 2.85 | 2.98 | 3.17 |
| Ind3 | 1.544 | 1.544 | 1.532 |
| Ind4 | 1.650 | 1.650 | 1.650 |
| Ind6 | 1.639 | 1.639 | 1.639 |
| Abv3 | 56.093 | 56.093 | 55.856 |
| Abv4 | 21.474 | 21.474 | 21.474 |
| Abv6 | 23.517 | 23.517 | 23.517 |

Figure 7:
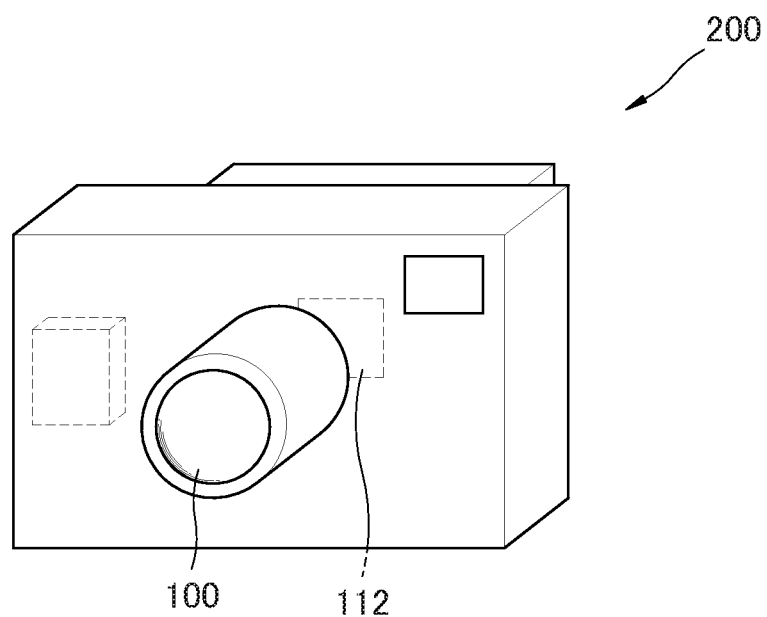
FIG. 7 is a schematic perspective view illustrating an imaging device including a lens optical system according to an aspect of the disclosed embodiment.

FIG. 7 is a view illustrating an imaging device 200 including a lens optical system 100 according to an embodiment. The imaging device 200 may include: the lens optical system 100; and an image sensor 112 configured to convert images formed by the lens optical system 100 into electric image signals. The lens optical system 100 may be any one of the lens optical systems described with reference to FIGS. 1 to 6. Any one of the lens optical systems of the above-described embodiments may be applied to an imaging device such as a small digital camera, a mobile phone camera, or an automotive camera. In this manner, a high-performance imaging device capable of capturing images with a wide field of view may be provided.

The imaging device 200 illustrated in FIG. 7 is merely an example. That is, the inventive concept may be applied to various optical devices. For example, the lens optical systems of the disclosed embodiment may be used as lens optical systems of automotive cameras. In addition, the lens optical systems of the disclosed embodiment may be applied to devices such as virtual reality devices or augmented reality devices. For example, the lens optical systems of the disclosed embodiment may be oriented in opposite directions in virtual reality devices. For example, the lens optical systems of the disclosed embodiment may be applied to various automotive devices such as black boxes, around view monitoring (AVM) systems, or rear cameras. In addition, the lens optical systems of the disclosed embodiment may be applied to various action cameras such as drones or camcorders for leisure or sports activities. In addition, the lens optical systems of the disclosed embodiment may be applied to various surveillance cameras.

Although many specific features have been described, these features should be considered in a descriptive sense only and not for purposes of limitation. That is, such features should be considered as examples according to aspects of the disclosed embodiment. For example, it will be apparent to those of ordinary skill in the art that although the shapes of the lenses of the lens optical systems of the disclosed embodiment are modified to some degree, the above-described effects may be obtained as long as the lens optical systems satisfy at least one of Conditions 1 to 8. In addition, although the lens optical systems of the disclosed embodiment do not satisfy some of Conditions 1 to 8, if the distribution of the refractive powers of the lenses, the structural conditions of the lenses, and other conditions are satisfied, the above-described effects may be obtained. Other various embodiments may be provided. Thus, the scope and spirit of the inventive concept are defined not by the descriptions of the disclosed embodiment but by the appended claims.

It should be understood that the disclosed embodiment described herein should be considered in a descriptive sense only and not for purposes of limitation. Descriptions of features or aspects within each disclosed embodiment should typically be considered as available for other similar features or aspects in other disclosed embodiments.

While one or more disclosed embodiments have been described with reference to the figures, it will be understood by those of ordinary skill in the art that various changes in form and details may be made therein without departing from the spirit and scope of the disclosure as defined by the following claims.

What is claimed is:

1. An lens optical system, from an object side toward an image plane side, comprising:
   a first lens having a negative refractive power;
   a second lens having a positive refractive power;
   a third lens having a positive refractive power;
   a fourth lens having a negative refractive power;
   a fifth lens having a positive refractive power; and
   a sixth lens having a negative refractive power,
   wherein the lens optical system satisfies the following conditions:

$100 \leq FOV \leq 160$      Condition 1:

$DiaL3 \leq DiaL1 \leq DiaL6$      Condition 2:

$0.6 \leq TTL/IH \leq 1.1$      Condition 3:

where FOV refers to a field of view of the lens optical system in degrees (°), and DiaL1, DiaL3, and DiaL6 refer to effective diameters of the first lens, the third lens, and the sixth lens, respectively, and where TTL refers to a distance in millimeters (mm) from a center of an entrance surface of the first lens to an image plane, and IH refers to an image height in millimeters (mm) by an effective diameter of the lens optical system.

2. The lens optical system of claim 1, wherein the lens optical system satisfies the following condition:

$0.8 \leq Ind3/Ind4 \leq 1.1$      Condition 4:

where Ind3 and Ind4 refer to refractive indexes of the third and fourth lenses, respectively.

3. The lens optical system of claim 2, wherein the lens optical system satisfies the following condition:

$1.5 \leq Abv3/Abv6 \leq 3.0$      Condition 5:

where Abv3 and Abv6 refer to Abbe numbers of the third and sixth lenses, respectively.

4. The lens optical system of claim 1, further comprising an aperture stop between the second lens and the third lens.

5. The lens optical system of claim 1, wherein the lens optical system satisfies at least one of the following conditions:

$0.2 \leq (L1toL2)/OAL \leq 0.45$      Condition 6:

$1.5 \leq Abv3/Abv4 \leq 3.0$      Condition 7:

$0.8 \leq Ind3/Ind6 \leq 1.1$      Condition 8:

where L1toL2 refers to a distance in millimeters (mm) between a center of an entrance surface of the first lens and a center of an exit surface of the second lens, OAL refers to a distance in millimeters (mm) between the center of the entrance surface of the first lens and a center of an exit surface of the sixth lens, Abv3 and Abv4 respectively refer to Abbe numbers of the third and fourth lenses, and Ind3 and Ind6 respectively refer to refractive indexes of the third and sixth lenses.

6. The lens optical system of claim 1, wherein an exit surface of the first lens is concave toward the image plane side.

7. The lens optical system of claim 1, wherein an exit surface of the fifth lens is convex toward the image plane side.

8. The lens optical system of claim 1, wherein at least one of the first to sixth lenses is an aspherical lens.

9. The lens optical system of claim 1, wherein at least one of the first to sixth lenses is a plastic lens.

10. The lens optical system of claim 9, wherein at least one of an entrance surface and an exit surface of the sixth lens is concave toward the image plane side in a center region thereof and is convex toward the image plane side in a peripheral region thereof.

11. The lens optical system of claim 1, wherein an entrance surface of the first lens has a meniscus shape convex toward the object side.

12. An imaging device comprising:
    the lens optical system of claim 1; and
    a solid-state imaging device configured to pick up an image formed by the lens optical system.

13. A lens optical system comprising a front lens group, an aperture stop, and a rear lens group that are sequentially arranged from an object side toward an image plane side,
    wherein the front lens group comprises a first lens having an exit surface concave toward the image plane side, and a second lens having a positive refractive power, and
    the rear lens group comprises a third lens closest to the object side and having a positive refractive power, and an image plane lens closest to the image plane side and having a negative refractive power,
    wherein the lens optical system satisfies the following conditions:

$100 \leq FOV \leq 160$      Condition 1':

$0.6 \leq TTL/IH \leq 1.1$      Condition 2':

wherein FOV refers to a field of view of the lens optical system in degrees (°), TTL refers to a distance in millimeters (mm) from a center of an entrance surface of the first lens to an image plane, and IH refers to an image height in millimeters (mm) by an effective diameter of the lens optical system.

14. The lens optical system of claim 13, further comprising a fourth lens having a negative refractive power and a fifth lens having a positive refractive power, the fourth and fifth lenses being sequentially arranged between the third lens and the image plane lens in a direction from the object side toward the image plane side.

15. The lens optical system of claim 14, wherein the lens optical system satisfies all of the following conditions:

$DiaL3 \leq DiaL1 \leq DiaL6$  Condition 3':

$0.8 \leq Ind3/Ind4 \leq 1.1$  Condition 4':

wherein DiaL1, DiaL3, and DiaL6 respectively refer to effective diameters of the first lens, the third lens, and the image plane lens, and Ind3 and Ind4 respectively refer to refractive indexes of the third and fourth lenses.

16. The lens optical system of claim 13, wherein the lens optical system satisfies the following condition:

$1.5 \leq Abv3/Abv6 \leq 3.0$  Condition 5':

where Abv3 and Abv6 refer to Abbe numbers of the third lens and the image plane lens, respectively.

17. The lens optical system of claim 13, wherein the first lens has a negative refractive power.

18. The lens optical system of claim 13, wherein at least one of an entrance surface and an exit surface of the image plane lens has at least one inflection point in a direction from a center region to an edge thereof.

19. The lens optical system of claim 13, wherein at least one of the lenses of the front lens group and the rear lens group is an aspherical lens.

* * * * *